(12) United States Patent
Yamanaka et al.

(10) Patent No.: US 9,838,892 B2
(45) Date of Patent: *Dec. 5, 2017

(54) APPARATUS, MOBILE TERMINAL, AND METHOD TO ESTIMATE QUALITY OF EXPERIENCE OF APPLICATION

(71) Applicant: EMPIRE TECHNOLOGY DEVELOPMENT LLC, Wilmington, DE (US)

(72) Inventors: Naoaki Yamanaka, Tokyo (JP); Eiji Oki, Tokyo (JP); Yutaka Arakawa, Fukuoka (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,262

(22) Filed: Oct. 17, 2014

(65) Prior Publication Data

US 2015/0036531 A1 Feb. 5, 2015

Related U.S. Application Data

(63) Continuation of application No. 13/497,636, filed as application No. PCT/US2011/066702 on Dec. 22, 2011, now Pat. No. 8,880,689.

(51) Int. Cl.
*G06F 15/16* (2006.01)
*H04W 24/08* (2009.01)
(Continued)

(52) U.S. Cl.
CPC ......... *H04W 24/08* (2013.01); *H04L 41/5067* (2013.01); *H04L 67/04* (2013.01);
(Continued)

(58) Field of Classification Search
CPC ..... H04L 65/80; H04L 41/5038; G06F 15/16; G06Q 10/06311
(Continued)

(56) References Cited

U.S. PATENT DOCUMENTS 6,035,207 A * 3/2000 Wang ................... H04W 16/04
455/450
7,599,307 B2 10/2009 Seckin et al.
(Continued)

FOREIGN PATENT DOCUMENTS

CN 102118270 A 7/2011
CN 103262484 A 8/2013
(Continued)

OTHER PUBLICATIONS

"Video distribution objective quality evaluation technology NTT has developed its own to adopt international standards," NTT, accessed on https://web.archive.org/web/20111221050439/http://www.ntt.co.jp//news/news08/0808/080825a.html, published on Aug. 25, 2008, pp. 1-3.
(Continued)

*Primary Examiner* — Tesfay Yohannes
(74) *Attorney, Agent, or Firm* — Brundidge & Stanger, P.C.

(57) ABSTRACT

A method of notifying estimated QoEs (Quality of Experiences) for applications between a mobile terminal and a plurality of application servers that provide services of the applications, may measure first QoEs for the applications between the apparatus and the mobile terminal, measure second QoEs for the applications between the apparatus and the application server, estimate the estimated QoEs for the applications, based on the first and second QoEs for the applications, and notify the estimated QoEs to the mobile terminal.

15 Claims, 8 Drawing Sheets

(51) Int. Cl.
  *H04L 29/08*   (2006.01)
  *H04W 4/18*   (2009.01)
  *H04L 12/24*   (2006.01)
  *H04W 4/00*   (2009.01)
  *H04W 48/18*   (2009.01)
  *H04L 12/26*   (2006.01)

(52) U.S. Cl.
  CPC ............. *H04L 67/322* (2013.01); *H04W 4/00* (2013.01); *H04W 4/003* (2013.01); *H04W 4/18* (2013.01); *H04L 41/0893* (2013.01); *H04L 41/5096* (2013.01); *H04L 43/087* (2013.01); *H04L 43/0835* (2013.01); *H04L 43/0858* (2013.01); *H04L 43/0882* (2013.01); *H04W 48/18* (2013.01)

(58) Field of Classification Search
  USPC .................................. 709/224, 233; 370/210
  See application file for complete search history.

(56) References Cited

U.S. PATENT DOCUMENTS

| | | | |
|---|---|---|---|
| 7,706,291 B2 | 4/2010 | Luft et al. | |
| 7,929,450 B2 | 4/2011 | Dolganow et al. | |
| 8,180,385 B2 | 5/2012 | Aaron et al. | |
| 8,280,994 B2 | 10/2012 | Blouin et al. | |
| 8,532,061 B2 | 9/2013 | Li et al. | |
| 8,543,085 B2 | 9/2013 | Jung | |
| 8,732,662 B1 | 5/2014 | Savant | |
| 8,880,689 B2 | 11/2014 | Yamanaka et al. | |
| 8,892,731 B2 | 11/2014 | Oki et al. | |
| 9,049,617 B2 | 6/2015 | Tofighbakhsh | |
| 9,060,191 B2 | 6/2015 | Chhaochharia et al. | |
| 9,237,339 B1 | 1/2016 | Bordner-Babayigit et al. | |
| 9,413,848 B2 | 8/2016 | Oki et al. | |
| 2003/0232614 A1* | 12/2003 | Squibbs | G06Q 30/02 455/405 |
| 2004/0073388 A1 | 4/2004 | Dorny et al. | |
| 2004/0184461 A1 | 9/2004 | Forssell et al. | |
| 2006/0069802 A1* | 3/2006 | Vedantham | H04L 12/1868 709/233 |
| 2006/0095864 A1* | 5/2006 | Mock | G06F 1/3203 715/810 |
| 2006/0294582 A1 | 12/2006 | Linsley-Hood et al. | |
| 2007/0053331 A1* | 3/2007 | Kolding | H04W 72/1236 370/338 |
| 2008/0104228 A1 | 5/2008 | Dacosta | |
| 2009/0013070 A1* | 1/2009 | Srivastava | H04L 43/12 709/224 |
| 2009/0086651 A1 | 4/2009 | Luft et al. | |
| 2009/0180451 A1* | 7/2009 | Alpert | H04W 72/1215 370/338 |
| 2009/0219811 A1 | 9/2009 | Dolganow et al. | |
| 2010/0008224 A1* | 1/2010 | Lyonnet | H04L 41/00 370/231 |
| 2010/0020717 A1 | 1/2010 | McGregor et al. | |
| 2010/0057359 A1 | 3/2010 | Caballero et al. | |
| 2010/0248643 A1 | 9/2010 | Aaron et al. | |
| 2010/0268524 A1 | 10/2010 | Nath et al. | |
| 2011/0019542 A1* | 1/2011 | Bernstein | H04L 41/5009 370/230 |
| 2011/0149775 A1 | 6/2011 | Lee et al. | |
| 2011/0161409 A1 | 6/2011 | Nair et al. | |
| 2011/0202593 A1 | 8/2011 | Vaderna et al. | |
| 2011/0211464 A1 | 9/2011 | Chetlur et al. | |
| 2011/0243553 A1* | 10/2011 | Russell | G06Q 30/0631 398/25 |
| 2011/0267948 A1* | 11/2011 | Koc | H04L 5/003 370/235 |
| 2011/0280138 A1 | 11/2011 | Terry | |
| 2011/0317631 A1 | 12/2011 | Navda et al. | |
| 2012/0149382 A1* | 6/2012 | Fox | H04W 36/245 455/445 |
| 2012/0155398 A1* | 6/2012 | Oyman | H04L 47/26 370/329 |
| 2013/0055136 A1 | 2/2013 | Aaron et al. | |
| 2013/0148525 A1 | 6/2013 | Cuadra Sánchez et al. | |
| 2013/0223208 A1 | 8/2013 | Liao et al. | |
| 2013/0343222 A1 | 12/2013 | Chen et al. | |
| 2014/0334309 A1* | 11/2014 | Mihaly | H04L 47/2441 370/235 |

FOREIGN PATENT DOCUMENTS

| | | | |
|---|---|---|---|
| EP | 2154647 A1 | 2/2010 | |
| JP | 2006080683 A | 3/2006 | |
| JP | 2006262453 A | 9/2006 | |
| WO | 2010144833 A2 | 12/2010 | |

OTHER PUBLICATIONS

International Search Report and Written Opinion for International Application No. PCT/JP2011/004805, mailed on Sep. 27, 2011.
International Search Report and Written Opinion for International Patent Application No. PCT/US2011/066702, mailed on Mar. 7, 2012.
Kim, H.-J., et al., "The QoE Evaluation Method through the QoS-QoE Correlation Model," NCM'08 Fourth International Conference on Networked Computing and Advanced Information Management, vol. 2, pp. 719-725, (Sep. 2-4, 2008).
Takahashi, A., "Standardization activities for QoE assessment of multimedia services," IEICE Technical Report, Communication Quality, pp. 49-54 (Apr. 2007).
Takahashi, A., "Standardization Activities in the ITU for a QoE Assessment of IPTV," IEEE Communications Magazine, vol. 46, No. 2, pp. 78-84 (Feb. 2008).
Extended European Search Report for counterpart Patent Application No. 11871636.4 dated Jun. 17, 2015.
Soldani, D., et al., "Qos and QoE Management in UMTS Cellular Systems," pp. 24 (Nov. 6, 2006) http://onlinelibrary.wiley.com/doi/10.1002/9780470034057.fmatter/pdf.

* cited by examiner

APPARATUS, MOBILE TERMINAL, AND METHOD TO ESTIMATE QUALITY OF EXPERIENCE OF APPLICATION

CROSS-REFERENCE TO RELATED APPLICATIONS

The present application is a continuation under 35 U.S.C. §120 of U.S. application Ser. No. 13/497,636, filed on Mar. 22, 2012 (now U.S. Pat. No. 8,880,689), which is a U.S. national stage filing under 35 U.S.C. §371 of International Application No. PCT/US2011/066702, filed on Dec. 22, 2011. The entire contents of U.S. Application No. 13/497,636 and International Application No. PCT/US2011/066702 are incorporated herein by reference.

TECHNICAL FIELD

The disclosure relates to a technology to estimate a QoE (Quality of Experience) of application software (hereinafter simply referred to as "application") between a mobile terminal and an application server.

BACKGROUND ART

Unless otherwise indicated herein, the approaches described in this section are not prior art to the claims in this application and are not admitted to be prior art by inclusion in this section.

A mobile terminal may use an application to receive services of the application from an application server. For example, the application may be related to e-mail, IP (Internet Protocol) telephony, IP audio and/or video distribution or broadcasting, video conferencing, map searching, etc. The mobile terminal may observe a status of radio wave reception from a network provider or a wireless LAN (Local Area Network), for example, in order to ascertain a bandwidth currently available to the mobile terminal. A user (or operator) of the mobile terminal may determine whether to use the application based on the radio wave reception status.

However, with the observation of the radio wave reception status of the mobile terminal, it may not be possible to ascertain the QoE of the application between the mobile terminal and the application server providing the services of the application.

The QoE may sometimes also be referred to as "quality of user experience", and is a subjective and/or objective measure of a user's (or customer's) experiences with a service. The QoE may be related to Quality of Service (QoS), but differs from the QoS.

SUMMARY

One aspect of the embodiment may provide a technology for estimating the QoE of application between a mobile terminal and an application server.

According to another aspect of the embodiment, an apparatus communicable with an application server and a mobile terminal, may include a first measuring unit configured to measure a first QoE (Quality of Experience) for an application between the apparatus and the mobile terminal based on information related to the application; and an estimating unit configured to estimate, based on the first QoE for the application and a second QoE for the application between the apparatus and the application server that provides services of the application, a third QoE for the application between the mobile terminal and the application server.

According to still another aspect of the embodiment, a mobile terminal communicable with a base station, may include a transmitter/receiver configured to send information related to a plurality of applications that are executable in the mobile terminal to the base station and to receive from the base station QoEs (Quality of Experiences) for the plurality of applications between the mobile terminal and a plurality of application servers that provide services of the plurality of applications; a display unit configured to display the QoEs for the plurality of applications received by the transmitter/receiver; and a control unit configured to control the transmitter/receiver in order to periodically send the information related to the plurality of applications to the base station.

According to a further aspect of the embodiment, a method of notifying estimated QoEs (Quality of Experiences) for a plurality of applications between a mobile terminal and a plurality of application servers that provide services of the plurality of applications, may include measuring first QoEs for the plurality of applications between the apparatus and the mobile terminal; measuring second QoEs for the plurality of applications between the apparatus and the application server; estimating the estimated QoEs for the plurality of applications, based on the first QoEs for the plurality of applications and the second QoEs for the plurality of applications; and notifying the estimated QoEs to the mobile terminal.

The foregoing summary is illustrative only and is not intended to be in any way limiting. In addition to the illustrative aspects, embodiments, and features described above, further aspects, embodiments, and further features will be apparent from the following detailed description when read in conjunction with the accompanying drawings.

BRIEF DESCRIPTION OF DRAWINGS

Subject matter is particularly pointed out and distinctly claimed in the concluding portion of the specification. The foregoing and other features of the present disclosure will become more fully apparent from the following detailed description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings:

DETAILED DESCRIPTION

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It may be readily understood that aspects of this disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to apparatuses, mobile terminals, and methods related to estimating the QoE (Quality of Experience) of application between a mobile terminal and an application server.

Briefly stated, techniques are generally described herein for QoE estimation.

Figure 1:
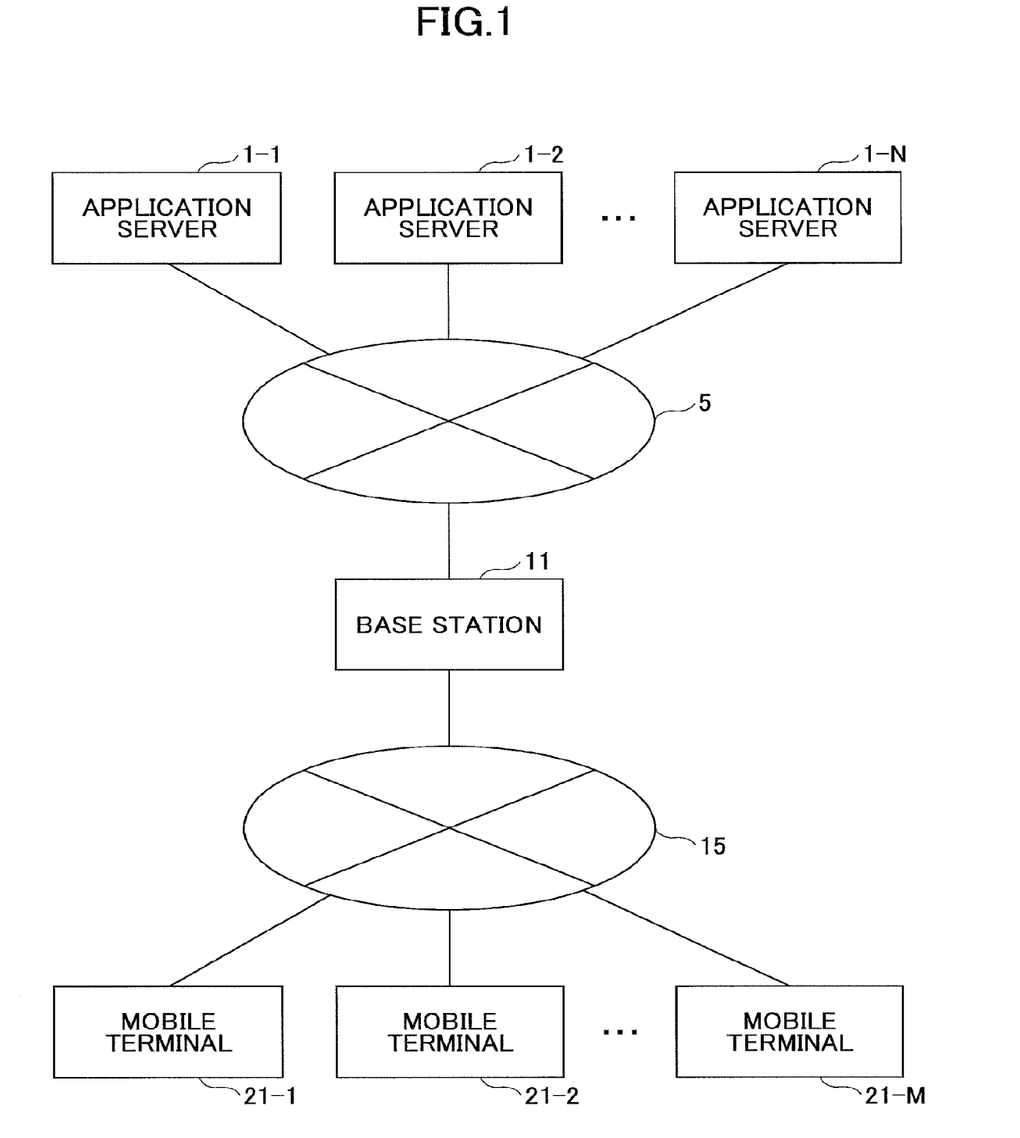
FIG. 1 is a block diagram illustrating an example of a communication system in an embodiment.

FIG. 1 is a block diagram illustrating an example of a communication system in an embodiment. The communication system illustrated in FIG. 1 may include a plurality of application servers 1-1 through 1-N (N is a natural number greater than or equal to 2), a base station 11, and a plurality of mobile terminals 21-1 through 21-M (M is a natural number greater than or equal to 2). Each application server 1-$i$ ($i$=1, . . . , N) may provide services of at least one arbitrary application. For example, the application may be related to e-mail, IP telephony, IP audio and/or video distribution or broadcasting, video conferencing, map searching, etc. The base station 11 and each application server 1-$i$ may communicate via a network 5. The network 5 may include a cable network, a wireless network, or a combination of cable and wireless networks. In addition, the network 5 may include the Internet. The base station 11 and each mobile terminal 21-$j$ ($j$=1, . . . , M) may communicate via a wireless network 15.

The base station 11 may communicate with a cloud computing system including the plurality of application servers 1-1 through 1-N that provide the services of a plurality of applications.

Figure 2:
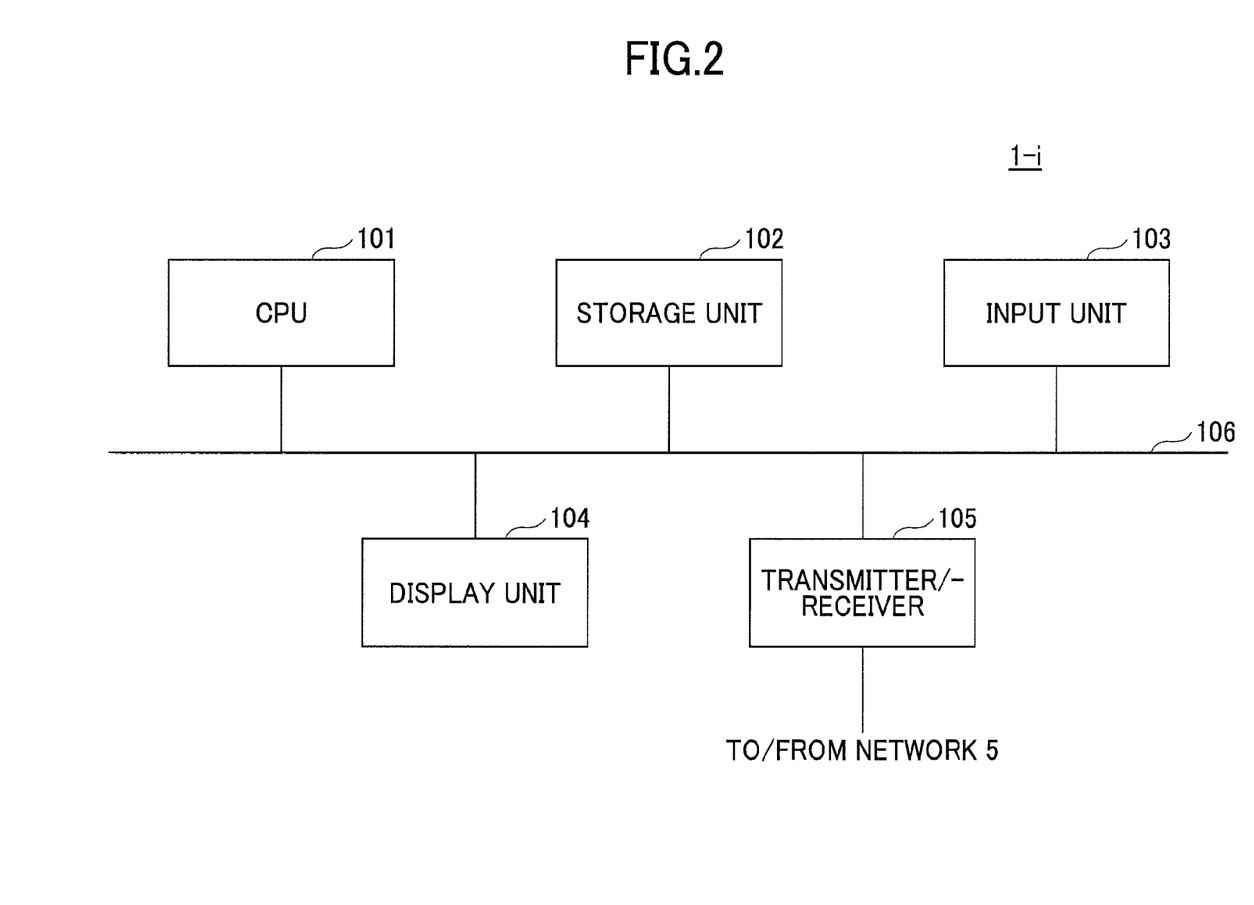
FIG. 2 is a block diagram illustrating an example of an application server.

FIG. 2 is a block diagram illustrating an example of the application server. The application server 1-$i$ illustrated in FIG. 2 may include a CPU (Central Processing Unit) 101 as an example of a processor, a storage unit 102, an input unit 103, a display unit 104, and a transmitter and receiver (hereinafter "transmitter/receiver") 105 that are connected via a bus 106. Instead of using the bus 106, the CPU 101 may be connected directly to another part of the application server 1-$i$, such as the input unit 103 and the display unit 104.

The CPU 101 may control operations of the application server 1-$i$, including an operation to provide services of the application provided by the application server 1-$i$, by executing programs.

For example, the storage unit 102 may be formed by a semiconductor memory device, a drive unit, and the like, in order to store the programs to be executed the CPU 101 and various data, including parameters and intermediate data obtained when operations are performed by the CPU 101. The drive unit may include or, be detachably loaded with a recording medium, such as a disk medium. For example, the disk medium may be formed by a magnetic disk, an optical disk or, a magneto-optical disk.

The input unit 103 may be formed by a keyboard, a mouse, or the like, in order to input data and instructions to the CPU 101. The display unit 104 may be formed by a LCD (Liquid Crystal Display) or the like, in order to display messages, the QoE of the applications, and the like. The input unit 103 and the display unit 104 may be formed integrally, by a touch-screen panel, for example.

The transmitter/receiver 105 includes a function to transmit data to and receive data from the network 5.

Figure 3:
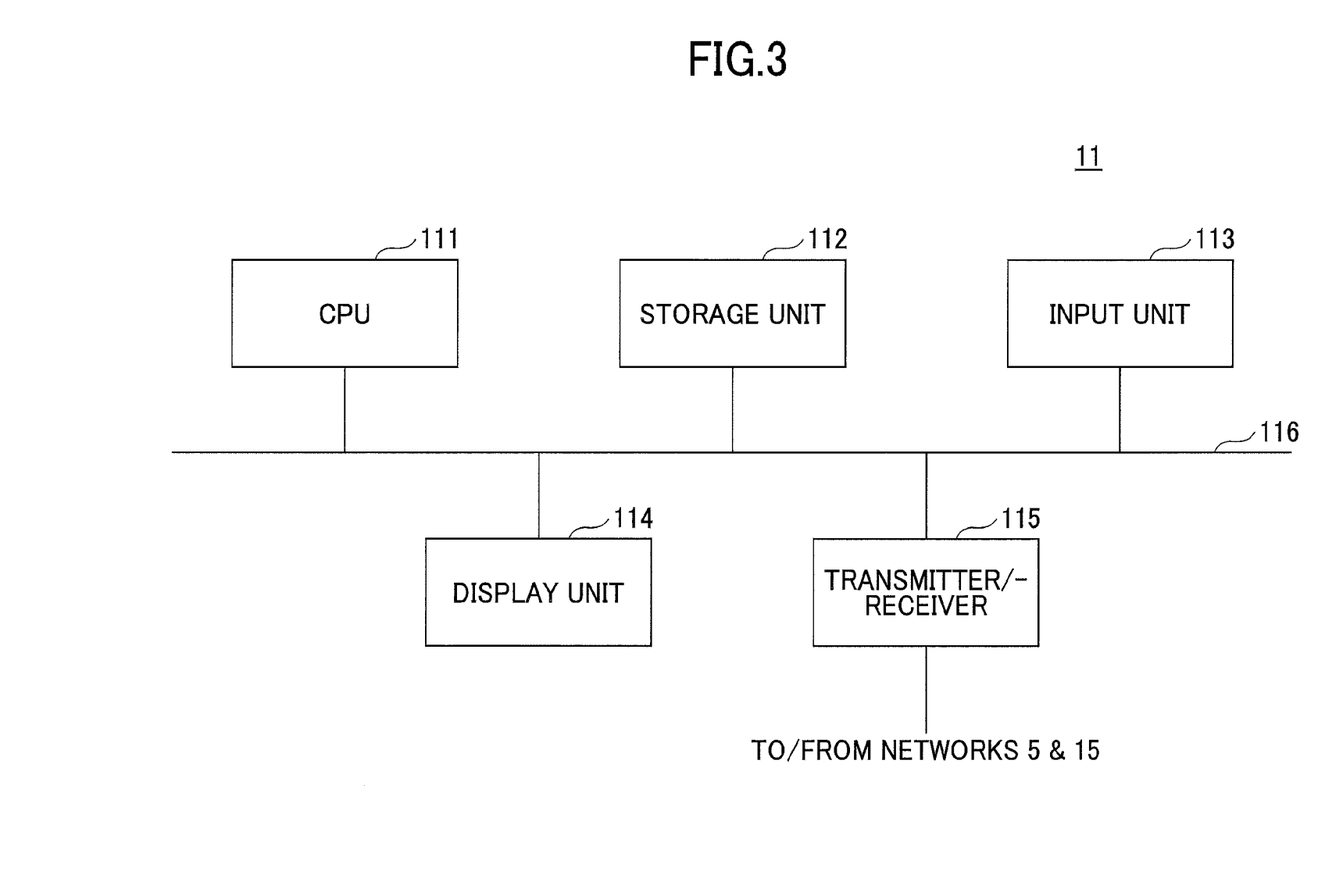
FIG. 3 is a block diagram illustrating an example of a base station.

FIG. 3 is a block diagram illustrating an example of the base station. The base station 11 illustrated in FIG. 3 may include a CPU 111 as an example of a processor, a storage unit 112, an input unit 113, a display unit 114, and a transmitter/receiver 115 that are connected via a bus 116. Instead of using the bus 116, the CPU 111 may be connected directly to another part of the base station 11, such as the input unit 113 and the display unit 114.

The CPU 111 may control operations of the base station 11, including at least an operation to measure the QoE of the application between the base station 11 and the application server 1-$i$ providing services of the application, an operation to communicate with the application servers 1-1 through 1-N, and an operation to communicate with the mobile terminals 21-1 through 21-M, by executing programs. The CPU 111 may control an operation to measure the QoE of the application between the base station 11 and the mobile terminal 21-$j$ that may use the application, by executing a program. The CPU 111 may control an operation to estimate the QoE of the application between the mobile terminal 21-$j$ that may use the application and the application server 1-$i$ providing services of the application, by executing a program.

For example, the storage unit 112 may be formed by a semiconductor memory device, a drive unit, and the like, in order to store the programs to be executed the CPU 111 and various data, including a list of applications, parameters and intermediate data obtained when operations are performed by the CPU 111. The input unit 113 may be formed by a keyboard, a mouse, or the like. The display unit 114 may be formed by a LCD or the like. The input unit 113 and the display unit 114 may be formed integrally, by a touch-screen panel, for example.

The transmitter/receiver 115 includes a function to transmit data to and receive data from the network 5, and to transmit data to and receive data from the network 15.

Figure 4:
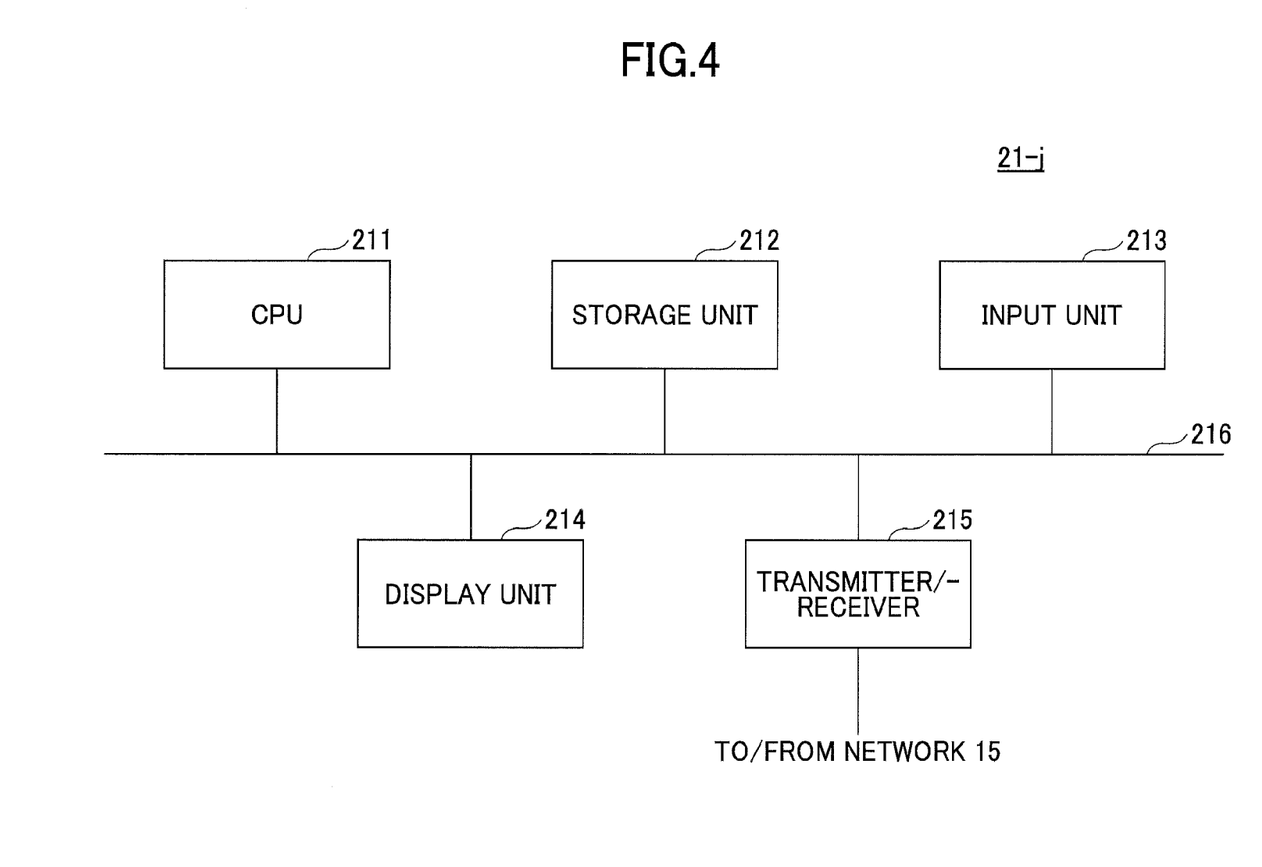
FIG. 4 is a block diagram illustrating an example of a mobile terminal.

FIG. 4 is a block diagram illustrating an example of the mobile terminal. The mobile terminal 21-$j$ illustrated in FIG. 4 may include a CPU 211 as an example of a processor, a storage unit 212, an input unit 213, a display unit 214, and a transmitter/receiver 215 that are connected via a bus 216. Instead of using the bus 216, the CPU 211 may be connected directly to another part of the mobile terminal 21-$j$, such as the input unit 213 and the display unit 214.

The CPU 211 may control operations of the mobile terminal 21-$j$, including at least an operation to communicate with the base station 11, by executing a program. The CPU 211 may control an operation to notify the list of applications that may be used (or are usable) by the mobile terminal 21-$j$, to the base station 11, by executing a program. The CPU 211 may control an operation to measure the QoE of the application, that may be used by the mobile terminal 21-$j$, between the mobile terminal 21-$j$ and the base station 11, by executing a program. The CPU 211 may control operations to acquire the QoE of the application, that may be used by the mobile terminal 21-$j$, between the base station 11 and the application server 1-$i$ providing services of the application, and to estimate the QoE of the application between the mobile terminal 21-$j$ and the application server 1-$i$, by executing a program.

For example, the storage unit 212 may be formed by a semiconductor memory device, a drive unit, and the like, in order to store the programs to be executed the CPU 211 and various data, parameters and intermediate data obtained when operations are performed by the CPU 211. The storage unit 212 may store the list of applications that may be used by the mobile terminal 21-*j*. The input unit 213 may be formed by a keyboard, a mouse, or the like. The display unit 214 may be formed by a LCD (Liquid Crystal Display) or the like, in order to display messages for a user (or operator) of the mobile terminal 21-*j*, including the QoE of the application, that may be used by the mobile terminal 21-*j*, between the mobile terminal 21-*j* and the application server 1-*i* providing services of the application. The input unit 213 and the display unit 214 may be formed integrally, by a touch-screen panel, for example.

The transmitter/receiver 215 includes a function to transmit data to and receive data from the network 15.

Figure 5:
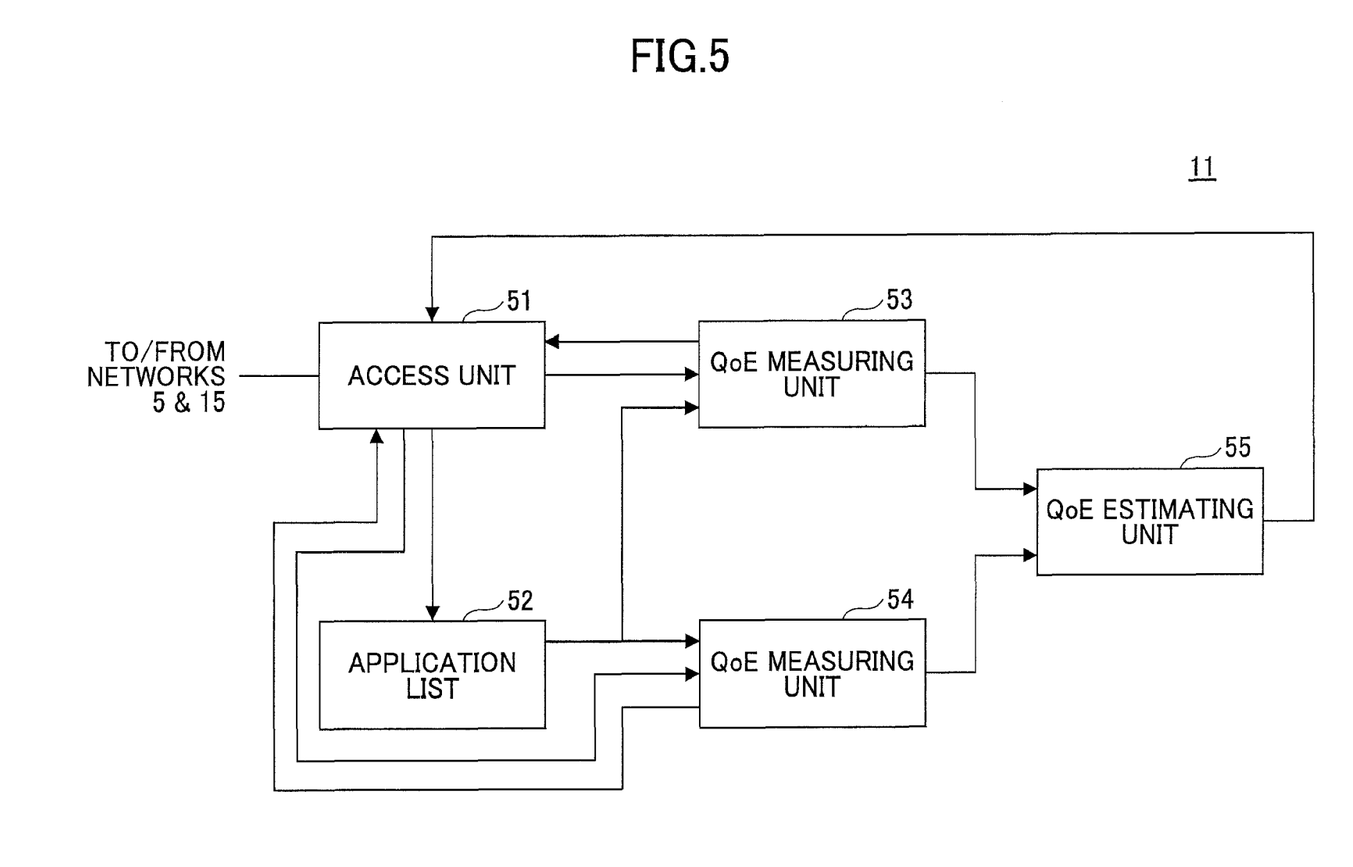
FIG. 5 is a functional block diagram illustrating an example of the base station.

FIG. 5 is a functional block diagram illustrating an example of the base station. FIG. 5 illustrates the functional structure of the base station 11 for an example in which the base station 11 performs a process including the following steps s1) through s3).

Step s1) Measuring the QoE of the application, that may be used by the mobile terminal 21-*j*, between the base station 11 and the application server 1-*i* providing services of the application;

Step s2) Measuring the QoE of the application, that may be used by the mobile terminal 21-*j*, between the base station 11 and the mobile terminal 21-*j*; and Step s3) Estimating the QoE of the application, that may be used by the mobile terminal 21-*j*, between the mobile terminal 21-*j* and the application server 1-*i* providing services of the application.

For example, the estimated QoE having a level or value greater than a predetermined value may indicate that the mobile terminal 21-*j* may receive the service with a high quality. On the other hand, the estimated QoE having a level or value less than or equal to the predetermined value may indicate that the mobile terminal 21-*j* may only receive the service with a low quality. In a case in which the application provides video distribution, for example, the video information may be viewed at the mobile terminal 21-*j* with a high quality (or high frame rate) when the level of the estimated QoE is high, and only with a low quality (or low frame rate) when the level of the estimated QoE is low.

The base station 11 illustrated in FIG. 5 may include an access unit (or module) 51, an application list 52, a QoE measuring unit (or module) 53, a QoE measuring unit (or module) 54, and a QoE estimating unit (or module) 55. For example, the access unit 51 may be formed by the transmitter/receiver 115, and the application list 52 may be stored in the storage unit 112. The QoE measuring units 53 and 54, and the QoE estimating unit 55 may be formed by the CPU 111.

The access unit 51 may receive, from the mobile terminal 21-*j*, a notification indicating the application that may be used by the mobile terminal 21-*j* or, a list of applications that may be used by the mobile terminal 21-*j*. For example, the mobile terminal 21-*j* may send the notification to the base station 11 when the mobile terminal 21-*j* enters a coverage area of the base station 11. In addition, the mobile terminal 21-*j* may send the notification periodically to the base station 11. The access unit 51 may store the application or the list of applications indicated by the notification from the mobile terminal 21-*j*, in the application list 52.

In a case in which the applications that may be used by the mobile terminal 21-*j* are known in advance, for example, the list of applications that may be used by the mobile terminal 21-*j* may be prestored in the application list 52. In this case, the notification from the mobile terminal 21-*j* may be unnecessary.

The QoE measuring unit 53 measures, for each application in the application list 52, the QoE between the base station 11 and each application server 1-*i* providing the services of each application. The QoE measuring unit 53 may measure the QoE periodically, for example. The QoE measuring unit 53 may actually download at least a part of each application and/or use each application or, send a test packet or the like for performance measurement, by communicating with each application server 1-*i* providing the services of each application via the access unit 51 and the network 5. In addition, the QoE measuring unit 53 may measure at least one of a bandwidth, a time delay, a jitter, and a loss of the application between the base station 11 and each application server 1-*i*. The QoE measured by the QoE measuring unit 53 may be stored in the storage unit 112, for example.

On the other hand, the QoE measuring unit 54 measures, for each application in the application list 52, the QoE between the base station 11 and the mobile terminal 21-*j* that may use each application. The QoE measuring unit 54 may measure the QoE periodically, for example. The QoE measuring unit 54 may actually download at least a part of each application and/or use each application or, send a test packet or the like for performance measurement, by communicating with each application server 1-*i* providing the services of each application via the access unit 51 and the network 5, and by communicating with the mobile terminal 21-*j* via the network 15. In addition, the QoE measuring unit 54 may measure at least one of a bandwidth, a time delay, a jitter, and a loss of the application between the base station 11 and the mobile terminal 21-*j*. The QoE measured by the QoE measuring unit 54 may be stored in the storage unit 112, for example.

The QoE measuring units 53 and 54 may form a single QoE measuring unit in order to eliminate a redundant process of the QoE measuring units 53 and 54 that actually downloads at least a part of each application and/or uses each application or, send a test packet or the like for performance measurement, by communicating with each application server 1-*i* providing the services of each application via the access unit 51 and the network 5. Alternatively, the QoE measuring unit 54 may utilize at least a part of each application actually downloaded by the QoE measuring unit 53 or, utilize the test packet or the like sent for performance measurement by the QoE measuring unit 53, in order to measure at least one of the bandwidth, the time delay, the jitter, and the loss of the application between the base station 11 and the mobile terminal 21-*j*.

The QoE estimating unit 55 estimates the QoE of each application between the mobile terminal 21-*j* and the application server 1-*i* providing the services of each application, based on the QoEs measured by the QoE measuring units 53 and 54, and notifies the estimated QoE to the mobile terminal 21-*j* via the access unit 51. The QoE estimating unit 55 may store the estimated QoE in the storage unit 112, for example. The mobile terminal 21-*j* may display on the display unit 214 thereof, the estimated QoE of each application between the mobile terminal 21-*j* and the application server 1-*i* providing the services of each application, notified from the base station 11.

When estimating the QoE based on the bandwidths, the QoE estimating unit 55 may estimate the QoE based on a lower one of the QoEs measured in the QoE measuring units 53 and 54. When measuring the bandwidth as the QoE, the QoE estimating unit 55 may estimate the QoE based on a smaller one of the QoEs measured in the QoE measuring units 53 and 54. When measuring the any one or a combination of the time delay, the jitter, and the loss of the application as the QoE, the QoE estimating unit 55 may estimate the QoE based on a sum of the QoEs measured in the QoE measuring units 53 and 54. When measuring the jitter as the QoE, the QoE estimating unit 55 may estimate the QoE based on a convolution of jitter distributions measured as the QoEs in the QoE measuring units 53 and 54.

In a case in which the mobile terminal 21-$j$ measures the QoE of each application between the mobile terminal 21-$j$ and the base station 11, the QoE measuring unit 54 of the base station 11 may be omitted. In this case, the mobile terminal 21-$j$ may notify at an arbitrary timing or, periodically, the QoE of each application between the mobile terminal 21-$j$ and the base station 11 to the base station 11.

In a case in which the mobile terminal 21-$j$ measures the QoE of each application between the mobile terminal 21-$j$ and the base station 11 and also estimates the QoE of each application between the mobile terminal 21-$j$ and the application server 1-$i$ providing the services of each application, the QoE measuring unit 54 and the QoE estimating unit 55 of the base station 11 may be omitted. In this case, the QoE measuring unit 53 of the base station 11 may notify at an arbitrary timing or, periodically, the QoE between the base station 11 and the application server 1-$i$ providing the services of each application to the mobile terminal 21-$j$ via the access unit 51. Further, the mobile terminal 21-$j$ may display on the display unit 214 thereof, the estimated QoE of each application between the mobile terminal 21-$j$ and the application server 1-$i$ providing the services of each application, estimated in the mobile terminal 21-$j$ using the QoE between the base station 11 and the application server 1-$i$ providing the services of each application, notified from the base station 11.

Figure 6:
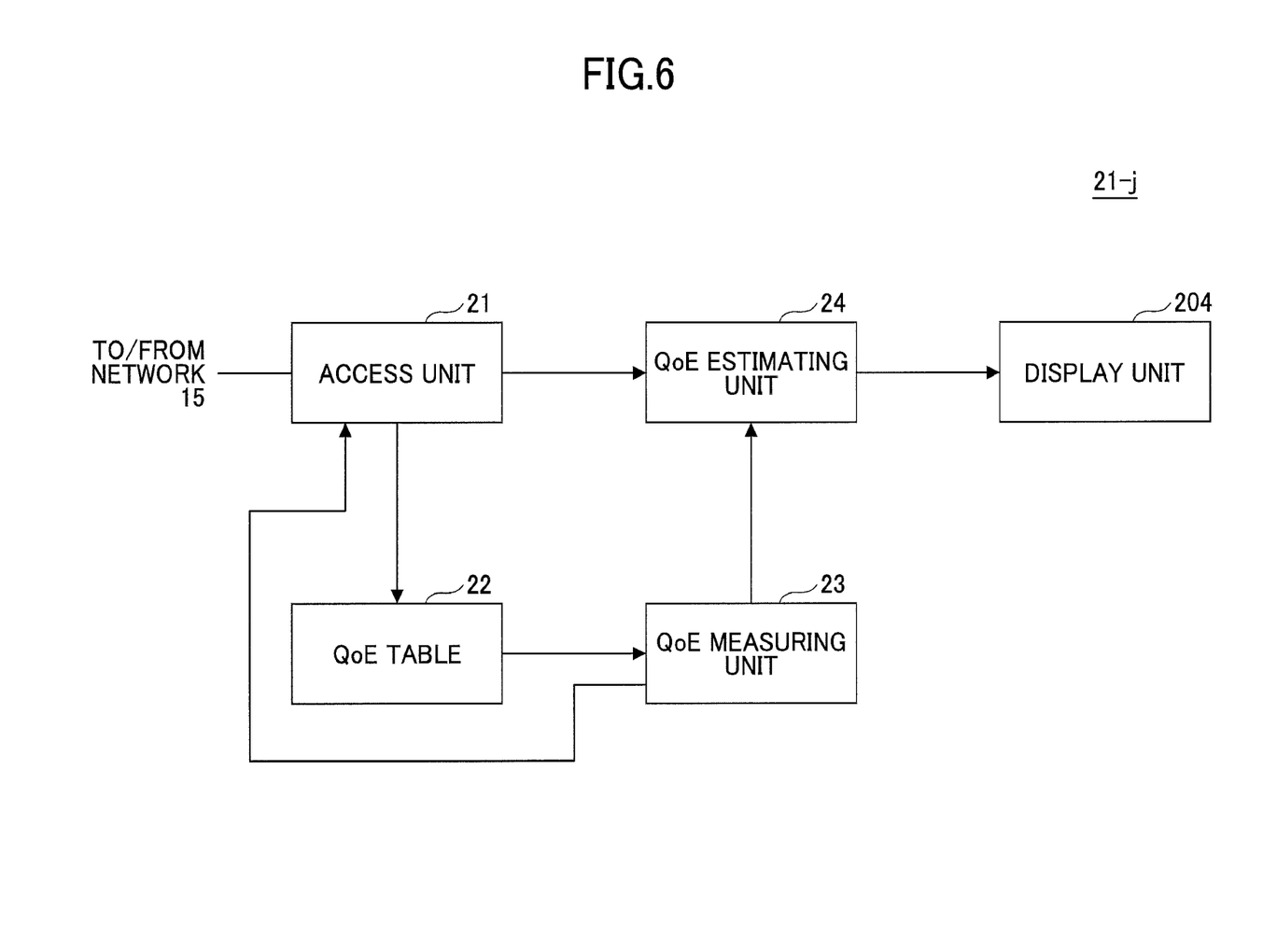
FIG. 6 is a functional block diagram illustrating an example of the mobile terminal.

FIG. 6 is a functional block diagram illustrating an example of the mobile terminal. FIG. 6 illustrates the functional structure of the mobile terminal 21-$j$ for an example in which the mobile terminal 21-$j$ performs a process including the following steps s11) through s13).

Step s11) Acquiring from the base station 11 the QoE of the application, that may be used by the mobile terminal 21-$j$, between the base station 11 and the application server 1-$i$ providing services of the application;

Step s12) Measuring the QoE of the application, that may be used by the mobile terminal 21-$j$, between the mobile terminal 21-$j$ and the base station 11; and Step s13) Estimating the QoE of the application, that may be used by the mobile terminal 21-$j$, between the mobile terminal 21-$j$ and the application server 1-$i$ providing services of the application.

The mobile terminal 21-$j$ illustrated in FIG. 6 may include an access unit (or module) 21, a QoE table 22, a QoE measuring unit (or module) 23, a QoE estimating unit (or module) 24, and the display unit 204. For example, the access unit 21 may be formed by the transmitter/receiver 215, and the QoE table 22 may be stored in the storage unit 212. The QoE measuring unit 23 and the QoE estimating unit 24 may be formed by the CPU 211. A process performed by the QoE measuring unit 23 corresponds to that performed by the QoE measuring unit 54 of the base station 11, and a process performed by the QoE estimating unit 24 corresponds to that performed by the QoE estimating unit 55 of the base station 11.

The access unit 21 may receive, from the base station 11, a notification indicating the QoE of each application that may be used by the mobile terminal 21-$j$ or, a list of applications that may be used by the mobile terminal 21-$j$, between the base station 11 and the application server 1-$i$ providing the services of each application. For example, the base station 11 may send the notification to the mobile terminal 21-$j$ when the mobile terminal 21-$j$ enters the coverage area of the base station 11. In addition, the base station 11 may send the notification periodically to the mobile terminal 21-$j$. The access unit 21 may store the QoE of each application or the QoEs of the list of applications indicated by the notification from the base station 11, in the QoE table 22.

In a case in which the applications that may be used by the mobile terminal 21-$j$ are known in advance, for example, the list of applications that may be used by the mobile terminal 21-$j$ may be prestored as an application list. This application list may be prestored in the QoE table 22. In this case, the QoE notified from the base station 11 may be stored in the QoE table 22 in correspondence with the application list prestored therein. Of course, the QoE table 22 and the application list may be stored separately in the storage unit 212, for example.

The QoE measuring unit 23 measures, for each application in the application list, the QoE between the mobile terminal 21-$j$ and the base station 11. The QoE measuring unit 23 may measure the QoE periodically, for example. The QoE measuring unit 23 may actually download at least a part of each application and/or use each application or, send a test packet or the like for performance measurement, by communicating with each application server 1-$i$ providing the services of each application via the base station 11, by communicating with the base station 11 via the access unit 21 and the network 15. In addition, the QoE measuring unit 23 may measure at least one of a bandwidth, a time delay, a jitter, and a loss of the application between the mobile terminal 21-$j$ and the base station 11. The QoE measured by the QoE measuring unit 23 may be stored in the storage unit 212, for example.

The QoE estimating unit 24 estimates the QoE of each application between the mobile terminal 21-$j$ and the application server 1-$i$ providing the services of each application, based on the QoE notified from the base station 11 and the QoE measured by the QoE measuring unit 23, and notifies the estimated QoE to the display unit 204 to be displayed thereon. The QoE estimating unit 24 may store the estimated QoE in the storage unit 212, for example. For example, the display unit 214 may display the level of the estimated QoE of each application between the mobile terminal 21-$j$ and the application server 1-$i$ providing the services of each application, in a manner distinguishable by at least one of mutually different colors representing the QoEs, mutually different colors of icons representing the plurality of applications, mutually different sizes of icons representing the plurality of applications, and mutually different motions of icons representing the plurality of applications.

In a case in which the base station 11 measures the QoE of each application between base station 11 and the mobile terminal 21-$j$, the QoE measuring unit 23 of the mobile terminal 21-$j$ may be omitted. In this case, the mobile terminal 21-$j$ may receive at an arbitrary timing or, periodically, the QoE of each application between the base station 11 and the mobile terminal 21-$j$, from the base station 11.

In a case in which the base station 11 measures the QoE of each application between base station 11 and the mobile terminal 21-$j$ and also estimates the QoE of each application between the mobile terminal 21-$j$ and the application server 1-$i$ providing the services of each application, the QoE measuring unit 23 and the QoE estimating unit 24 of the mobile terminal 21-$j$ may be omitted. In this case, the access unit 21 of the mobile terminal 21-$j$ may receive at an arbitrary timing or, periodically, the estimated QoE between the mobile terminal 21-$j$ and the application server 1-$i$ providing the services of each application from the base station 11. Further, the mobile terminal 21-$j$ may display on the display unit 214 thereof, the estimated QoE of each application between the mobile terminal 21-$j$ and the application server 1-$i$ providing the services of each application, received from the base station 11.

Next, a description will be given of examples of the methods of measuring the QoE. For the sake of convenience, a description will be given of the methods of measuring the QoE in the QoE measuring unit 53 of the base station 11. However, the methods of measuring the QoE in the QoE measuring unit 54 of the base station 11 and the methods of measuring the QoE in the QoE measuring unit 23 of the mobile terminal 21-$j$ may be similar to that in the QoE measuring unit 53 of the base station 11, and a description thereof will be omitted.

The QoE measuring unit 53 may actually download at least a part of each application (or at least a part of the services of each application) and/or use each application or, send a test packet or the like for performance measurement, by communicating with each application server 1-$i$ providing the services of each application via the network 5. In addition, the QoE measuring unit 53 may measure at least one of a bandwidth, a time delay, a jitter, and a loss of the application between the mobile terminal 21-$j$ and the base station 11.

As a first example, the QoE measuring unit 53 may perform a process including the following steps s21) through s23).

Step s21) Sending a request for receiving a service of the application or, a request for downloading at least a part of the application, to the application server 1-$i$ providing this service or, to the cloud computing system including at least the application server 1-$i$ providing this service.

Step s22) Receiving the service of the application or at least a part of the application, from the application server 1-$i$ or, from the cloud computing system.

Step s23) Measuring the QoE based on the received service of the application or the received part of the application. The QoE may be based on at least one of a bandwidth, a time delay, a jitter, and a loss of the service or the application. For example, the time delay may be a transfer time of the service or the part of the application received from the application server 1-$i$ or the cloud computing system, from a time when the request is sent from the base station 11. For example, the loss may be a packet loss rate of packets related to the service or the part of the application received from the application server 1-$i$ or the cloud computing system.

The QoE measuring unit 54 may measure the QoE of the application between the base station 11 and the mobile terminal 21-$j$ basically in the same manner as that of the QoE measuring unit 53. However, the base station 11 and the mobile terminal 21-$j$ may monitor a wireless communication rate therebetween. In this case, the QoE measuring unit 54 may measure the QoE based on the time delay detected from the wireless communication rate that is monitored by the base station 11 when the wireless communication rate is varied. Further, the QoE measuring unit 54 may measure the QoE based on the bandwidth detected from the highest wireless communication rate that is monitored by the base station 11 when the wireless communication rate is varied.

Similarly, the QoE measuring unit 23 of the mobile terminal 21-$j$ may measure the QoE based on the time delay or the bandwidth detected from the wireless communication rate monitored by the mobile terminal 21-$j$ when the wireless communication rate is varied.

Figure 7:
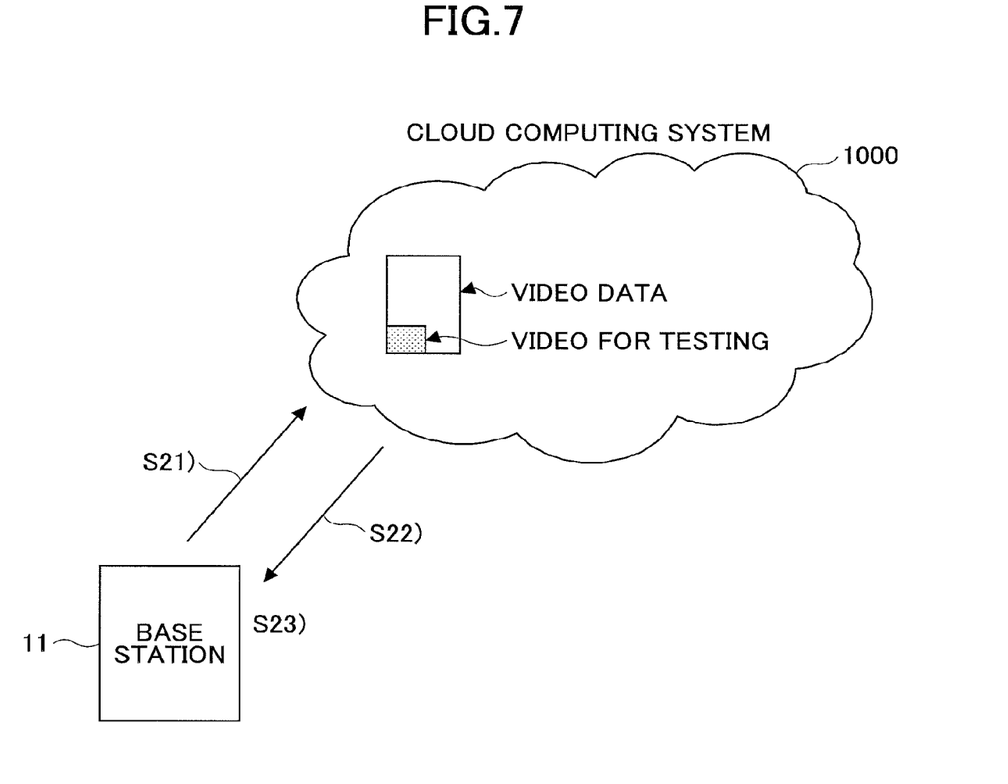
FIG. 7 is a diagram for explaining an example of a video distribution provided by an application.

FIG. 7 is a diagram for explaining an example of the video distribution provided by the application. In FIG. 7, the illustration of the network 5 is omitted for the sake of convenience.

In this case, the step s21) sends a request for viewing video for testing to a cloud computing system 1000 including at least the application server 1-$i$ providing this video testing service. The cloud computing system 1000 provides the service to distribute video data (or contents) including the video for testing (or a part of the contents). The step s22) receives the video for testing, responsive to the request for viewing the video for testing, from the cloud computing system 1000. The step s23) measures the QoE based on the video for testing received from the cloud computing system 1000. For example, the steps s21) through s23) may be performed periodically. The QoE may be based on at least one of a bandwidth, a time delay, a jitter, and a loss of the service or the application. For example, the time delay may be a transfer time of the video for testing received from the cloud computing system 1000, from a time when the request for viewing the video for testing is sent from the base station 11. For example, the loss may be a packet loss rate of packets related to the video for testing received from the cloud computing system 1000.

As a second example, the QoE measuring unit 53 may perform a process including the following steps s31) through s33), in a manner similar to the process proposed in a U.S. Pat. No. 7,929,450, for example.

Step s31) Sending a test packet or the like for performance measurement, such as a ping command, to the application server 1-$i$ providing this service or, to the cloud computing system including at least the application server 1-$i$ providing this service.

Step s32) Receiving a response to the test packet or the like for performance measurement, from the application server 1-$i$ or, from the cloud computing system.

Step s33) Measuring the QoE based on the received response from the application server 1-$i$ or, from the cloud computing system. The QoE may be based on at least one of a bandwidth, a time delay, a jitter, and a loss of the received response. For example, the time delay may be a transfer time of the received response from the application server 1-$i$ or the cloud computing system, from a time when the test packet or the like for performance measurement is sent from the base station 11. For example, the loss may be a packet loss rate of packets in the response received from the application server 1-$i$ or the cloud computing system.

Of course, the method of measuring the QoE is not limited to the methods described above, and various other methods may be employed.

Figure 8:
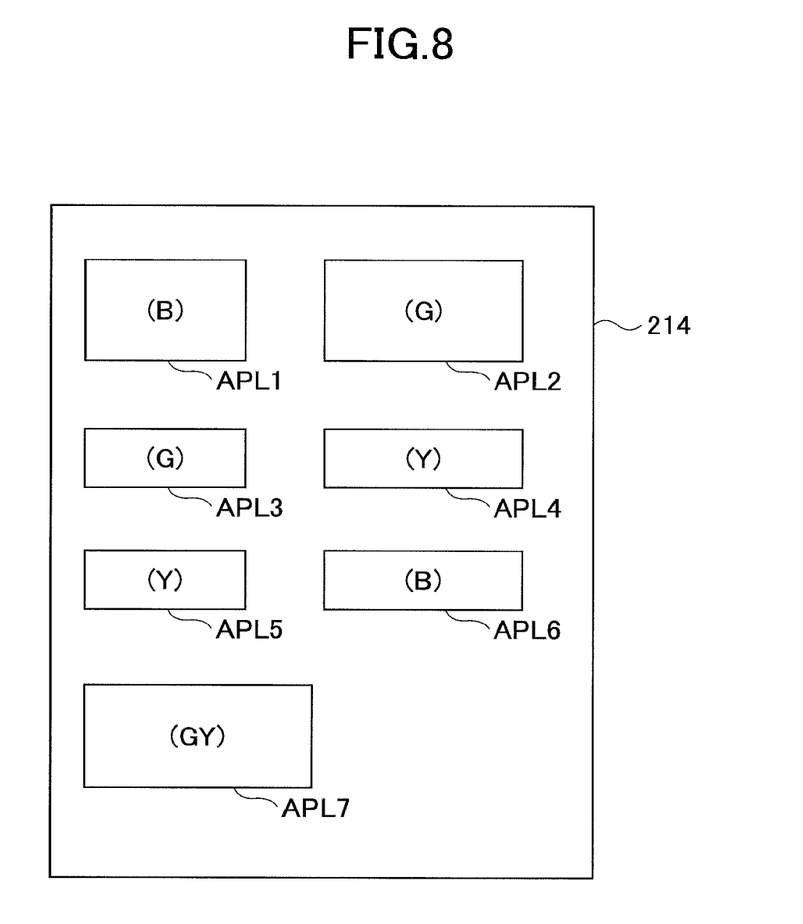
FIG. 8 is a diagram illustrating an example of a display of QoEs on the mobile terminal, all arranged in accordance with the present disclosure.

FIG. 8 is a diagram illustrating an example of a display of QoEs on the mobile terminal. The display unit 214 of the mobile terminal 21-$j$ may display levels of the QoEs for the plurality of applications in a manner distinguishable by at least one of mutually different colors representing the QoEs, mutually different colors of icons representing the plurality of applications, mutually different sizes of icons representing the plurality of applications, and mutually different motions of icons representing the plurality of applications.

FIG. 8 illustrates the example in which the levels of the QoEs for a plurality of applications APL1 through APL7 are displayed in a manner distinguishable by mutually different colors representing the QoEs or, mutually different colors of icons representing the plurality of applications or, mutually different sizes of icons representing the plurality of applications. For example, blue (B), green (G), yellow (Y), red (R), and gray (GY) icons or application names displayed in such colors may respectively represent very good, good, fair, bad, and unavailable levels of the QoEs for the applications APL1 through APL7. In addition, the icons displayed with larger sizes may represent higher levels of the QoEs for the applications APL1 through APL7, for example. Further, the icons displayed with the same color but with larger sizes may represent higher levels of the QoEs for the applications among the applications represented by the icons displayed with the same color, for example, in order to represent a relatively large number of levels of the QoEs.

The required quality of communication may vary depending on the applications. Hence, when the levels of the QoEs for the applications are displayed in a distinguishable manner on the display of the mobile terminal, the user of the mobile terminal may easily select a desired application based on the available levels of the QoEs for the applications.

When the QoE measuring unit 53 of the base station 11 estimates the QoE of the application between the base station 11 and the application server 1-$i$ or the cloud computing system providing services of the application, the measured QoE may be stored in the storage unit 112 and used in common by a plurality of mobile terminals that may use the same application and are located in the coverage area of the base station 11. In this case, the operation of measuring the QoE may be reduced considerably when compared to a case in which the QoE of the application between the base station 11 and the application server 1-$i$ or the cloud computing system is measured for one mobile terminal even if the QoE of this application between the base station 11 and the application server 1-$i$ or the cloud computing system has already been measured for another mobile terminal within the same coverage area of the base station 11. The effect of eliminating the need to measure the QoE of the same application between the base station 11 and the application server 1-$i$ or the cloud computing system separately for each of the mobile terminals located within the coverage area of the base station 11 may be large, because the measurement of the QoE between the base station 11 and the application server 1-$i$ or the cloud computing system is more complex and time-consuming compared to the measurement of the QoE between the base station 11 and each mobile terminal, and the distance between the base station 11 and the application server 1-$i$ or the cloud computing system is long compared to the distance between the base station 11 and each of the mobile terminals located within the coverage area of the base station 11.

In addition, the base station 11 may notify the QoEs estimated by the QoE estimating unit 55 for each of the applications that may be used by the mobile terminals located within the coverage area of the base station 11, to each of these mobile terminals located within the coverage area of the base station 11. Hence, each of the mobile terminals located within the coverage area of the base station 11 may dynamically and efficiently ascertain the QoEs of the individual applications that may be used thereby.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. An apparatus to estimate a quality of experience (QoE), the apparatus comprising:
    a processor,
    wherein the processor is configured to:
        measure a first QoE for an application between the apparatus and a mobile terminal;
        measure a second QoE for the application between the apparatus and an application server that provides a service of the application; and
        estimate, based on the first QoE and the second QoE, a third QoE for the application between the mobile terminal and the application server;
    a transmitter/receiver communicatively coupled to the processor and configured to:
        receive the third QoE from the processor; and
        communicate with the mobile terminal; and
    a storage communicatively coupled to the transmitter/receiver,
    wherein the transmitter/receiver is configured to:
        receive information that identifies the application from the mobile terminal,
    wherein the storage is configured to store the received information and the received third QoE; and
        send the third QoE to the mobile terminal, wherein the third QoE enables a user of the mobile terminal to select the application based on a level of the third QoE.

2. The apparatus of claim 1, wherein the processor is configured to periodically measure the second QoE for the application.

3. The apparatus of claim 1, wherein the processor is configured to estimate the third QoE for the application by comparison of the first and second QoEs for the application such that a lower one of the first and second QoEs is estimated as the third QoE.

4. The apparatus of claim 1, wherein the processor is further configured to communicate with a cloud computation system which includes a plurality of application servers that provide services of a plurality of applications usable by the mobile terminal.

5. The apparatus of claim 4, wherein:
    the processor is configured to:
        measure the first QoE for each of the plurality of applications;
        measure the second QoE for each of the plurality of applications; and
        measure the third QoE for each of the plurality of applications, and
    the transmitter/receiver is configured to send the third QoE for each of the plurality of applications to the mobile terminal.

6. A mobile terminal, comprising:
    a transmitter/receiver configured to:
        output information related to an application that is executable in the mobile terminal;
        receive, in accordance with the information, a notification of an estimate of a quality of experience (QoE) for the application between the mobile terminal and an application server that provides a service of the application; and
        output the estimated QoE to a base station;
    a display communicatively coupled to the transmitter/receiver and configured to display a level of the estimated QoE for the application received by the transmitter/receiver,
    wherein the displayed level of the estimated QoE enables a user of the mobile terminal to select the application; and
    a controller communicatively coupled to the transmitter/receiver and configured to control the transmitter/receiver in order to output the information related to the application.

7. The mobile terminal of claim 6, wherein the display is further configured to display levels of a plurality of estimated QoEs for a plurality of applications in a manner distinguishable by at least one of:
    mutually different colors that represent the estimated QoEs;

mutually different colors of icons that represent the plurality of applications;
mutually different sizes of icons that represent the plurality of applications; and
mutually different motions of icons that represent the plurality of applications.

8. The mobile terminal of claim 6, wherein the controller is configured to control the transmitter/receiver to identify the application in the information outputted to the base station.

9. A method to estimate a quality of experience (QoE), the method comprising:
outputting, by a mobile terminal, information that identifies an application to a base station;
measuring, by the mobile terminal, a first QoE for the application between the base station and the mobile terminal;
receiving, by the mobile terminal from the base station, a notification of a second QoE for the application between the base station and an application server;
estimating, by the mobile terminal, a third QoE for the application between the mobile terminal and the application server, as an estimated QoE, based on the first QoE and the second QoE; and
displaying, on a display of the mobile terminal, a level of the estimated QoE for the application, wherein the displayed level of the estimated QoE enables a user of the mobile terminal to select the application.

10. The method of claim 9, further comprising:
outputting the estimated QoE to the base station.

11. The method of claim 9, further comprising:
displaying, on the display of the mobile terminal, levels of estimated QoEs for a plurality of applications in a manner distinguishable by at least one of:
mutually different colors that represent the estimated QoEs;
mutually different colors of icons that represent the plurality of applications;
mutually different sizes of icons that represent the plurality of applications; and
mutually different motions of icons that represent the plurality of applications.

12. A non-transitory computer-readable medium having stored thereon instructions that, in response to execution by a computer device, cause the computer device to perform or control performance of operations to:
measure a first quality of experience (QoE) for an application between a base station, which comprises the computer device, and a mobile terminal;
measure a second QoE for the application between the base station and an application server that provides a service of the application;
estimate, based on the first QoE and the second QoE, a third QoE for the application between the mobile terminal and the application server;
input information that identifies applications usable by the mobile terminal;
store the information that identifies the applications usable by the mobile terminal; and
send the third QoE to the mobile terminal, wherein the third QoE enables a user of the mobile terminal to select the application based on a level of the third QoE.

13. The non-transitory computer-readable medium of claim 12, wherein the instructions further comprise instructions that, in response to execution by the computer device, cause the computer device to perform or control performance of at least one operation to:
send a request to receive the service of the application to the application server via a cloud computer system that includes the application server; and
receive the service of the application from the application server,
wherein the measurement of the second QoE is based on the received service of the application.

14. The apparatus of claim 1, wherein the processor is configured to:
measure the first QoE based on at least one of a bandwidth, a time delay, a jitter, and a loss of the application between the apparatus and the mobile terminal; and
measure the second QoE based on at least one of a bandwidth, a time delay, a jitter, and a loss of the application between the apparatus and the application server.

15. The apparatus of claim 1, wherein the processor is configured to measure the first QoE based on at least one of a time delay and a bandwidth detected from a wireless communication rate monitored by the apparatus while the wireless communication rate is varied.

* * * * *